United States Patent [19]

Sirek

[11] 3,982,843

[45] Sept. 28, 1976

[54] PISTON-SLEEVE COUPLING ARRANGEMENTS FOR A RADIAL PISTON PUMP

[75] Inventor: Thomas Sirek, Metzingen, Germany

[73] Assignee: Firma Wepuko-Hydraulik GmbH, Metzingen, Germany

[22] Filed: Feb. 20, 1975

[21] Appl. No.: 551,155

[52] U.S. Cl. .............................. 403/53; 29/441 R; 403/114; 403/122
[51] Int. Cl.² .................... F16B 7/10; F16C 11/00; F16D 1/12; F16J 1/14
[58] Field of Search .......... 403/114, 122, 112, 113, 403/119, 361, 76, 77, 132, 133, 138, 274, 53, 353; 29/441, 149.5

[56] References Cited
UNITED STATES PATENTS

| 1,050,422 | 1/1913 | Birchwood ............................ 29/441 |
| 3,501,180 | 3/1970 | Waara .................................. 403/77 |

FOREIGN PATENTS OR APPLICATIONS

| 818,549 | 8/1959 | United Kingdom ................. 403/114 |

Primary Examiner—Wayne L. Shedd

[57] ABSTRACT

An improved, easily disconnectable coupling between a spring-loaded piston and a socket-type sleeve member adapted to receive such piston in a high-pressure radial piston pump is described. The piston terminates at a rear end thereof in an enlarged spherical section that defines a volume smaller than a hemisphere. The socket member includes a spherical recess that receives the spherical section of the piston, and a surrounding edge region that is crimped inwardly at diametrically opposite portions to define a plane of oscillation of the sleeve member with respect to the piston and to capture the spherical member in the sleeve. In order to retain the coupling parts in operative association with each other, an external abutment ring is pressed over the piston adjacent the spherical section, such abutment ring extending radially outward to contact the front end of the sleeve member when the latter has oscillated through a limited predetermined angle with respect to the piston. After the bearing ring and the spring are removed, the spherical section can be swung free from the sleeve member to dismantle the sub-assembly, e.g. for maintenance purposes.

4 Claims, 3 Drawing Figures

U.S. Patent   Sept. 28, 1976   3,982,843
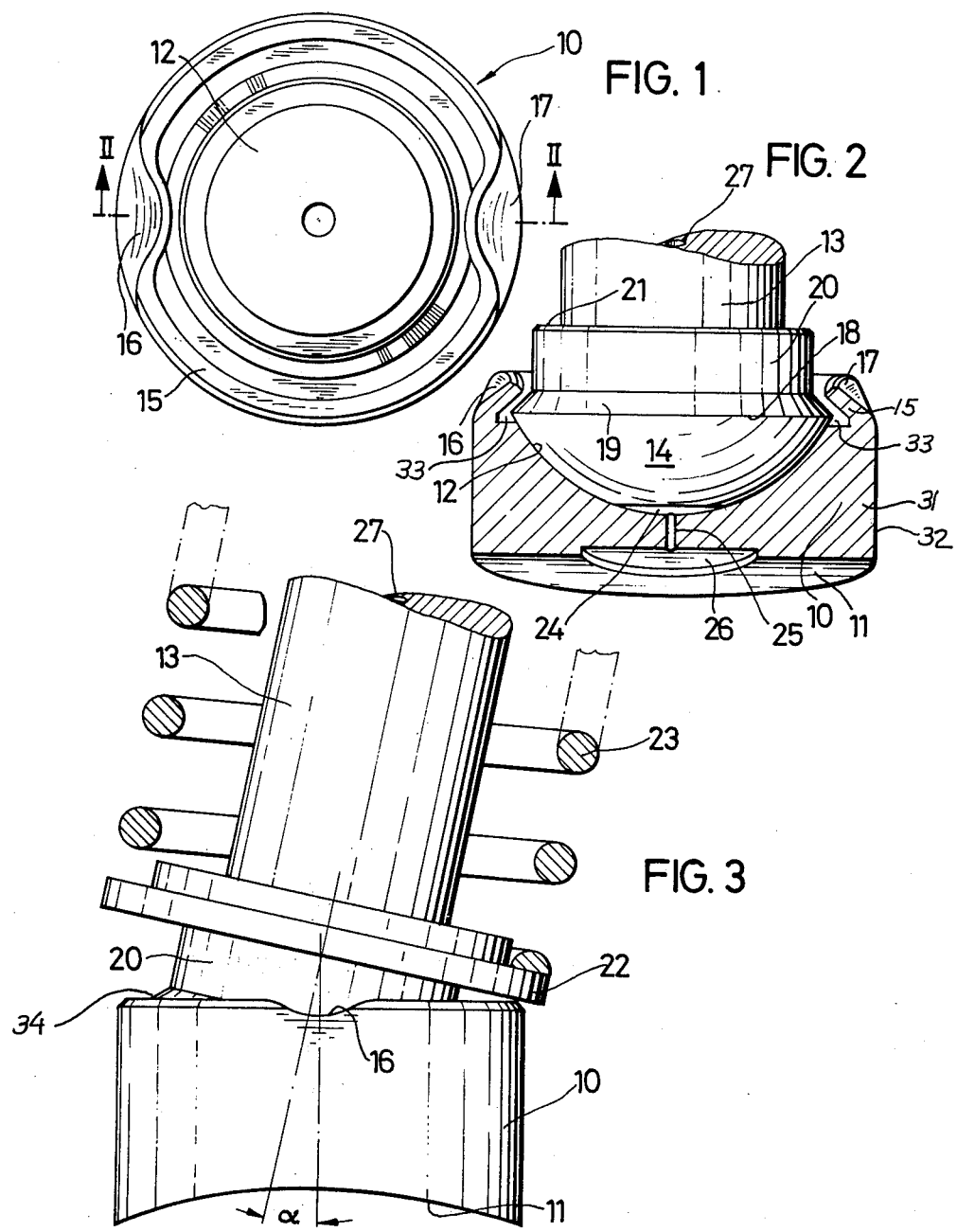

3,982,843

PISTON-SLEEVE COUPLING ARRANGEMENTS FOR A RADIAL PISTON PUMP

BACKGROUND OF THE INVENTION

Many types of high-pressure piston pumps of the radial type include at least one spring-loaded piston which terminates at its rear end in a coaxial spherical section, such section being operably receivable within a socket bore sleeve which is adapted for sliding movement within a chamber. Such sleeve member, which may have a rear surface associated with an eccentric shaft in a known manner, is generally given a limited capability for oscillation with respect to the mating spherical section of the piston. Conventional designs of this type are described, e.g., in German published applications Nos. 1,528,501, 1,403,748, and 2,030,358, and in Czechoslovakian Pat. No. 442,021.

In all known arrangements of this type, the sub-assembly of the piston and the sleeve is generally complex and expensive, and such known constructions are not adaptable to facilitate easy disconnection of the two halves of the sub-assembly for pump maintenance and other purposes. In addition, the known couplings of the spherical section of the piston to the mating spherical recess in the socket member afford little or no play in a movement of the sleeve, so that it is difficult to adjust the sleeve to correct for errors in the movement of the piston.

SUMMARY OF THE INVENTION

These disadvantages are overcome in the radial pump subassembly of the present invention, which provides an improved and easily disconnectable coupling between the piston and the sleeve.

In an illustrative embodiment, the spherical section is made smaller than a hemisphere, and is provided with a front boundary surface whose diameter is larger than the main diameter of the piston. The sleeve member includes a peripheral edge region which surrounds its spherical recess and includes a pair of diametrically opposed, inwardly extending crimped portions to establish a single plane of oscillation of the sleeve member with respect to the piston.

The inwardly extending portions of the edge region forwardly and inwardly overlap the front boundary surface of the spherical section to removably capture the piston. A gap established between the overlapping crimped portions and the surrounded front boundary surface of the spherical section permit a desirable axial play of the sleeve member with respect to the piston. The oscillation of the sleeve member along the plane established by the crimped portions is desirably limited to a predetermined angle by means of an abutment ring which is removably pressed over the piston and which has a diameter considerably larger than that of the spherical section. In particular, the abutment ring is arranged to contact the forward boundary surface of the sleeve member after such member has oscillated through the predetermined angle.

In order to disconnect the assembly, the abutment ring and the spring of the piston are removed, whereby the sleeve member can be rotated through an angle greater than the abovementioned predetermined angle, and can be swung free of the piston member.

If desired, a conical section can be disposed coaxial with the piston intermediate the rear end of the main piston portion and the front boundary surface of the spherical section. In such case, the conical section is arranged to taper inwardly in the forward direction.

BRIEF DESCRIPTION OF THE DRAWING

The invention is further set forth in the following detailed description taken in conjunction with the appended drawing, in which:

FIG. 1 is a top view of the sleeve portion of a piston-sleeve sub-assembly constructed in accordance with the invention;

FIG. 2 is a sectional view taken along line 2—2 of FIG. 1, illustrating the relative positions of the socket member and the piston when the latter is coupled to the socket member; and FIG. 3 is an elevational view, partially in section, of the assembled piston-sleeve sub-assembly of FIG. 1, illustrating additional facilities for limiting oscillatory movements of the sleeve with respect to the piston to a predetermined angle.

DETAILED DESCRIPTION

Referring now to the drawing, there is illustrated a sleeve member 10 integral with a piston of a piston-rod sub-assembly adapted for use in a high-pressure radial piston pump. The sleeve member includes a body portion 31 having a peripheral surface 32 that is disposed for conventional sliding movement in a chamber (not shown). A rear surface 11 of the sleeve member 10 is further disposed to receive an eccentric member (not shown) of the pump. Disposed on the forward side of the sleeve member 10 is a spherical recess 12, which is arranged to receive a spherical end section 14 of piston rod 13 to form the above-mentioned sub-assembly.

Surrounding the spherical recess 12 is a substantially closed edge member 15 of the sleeve body 31. The ring 15 is provided with a pair of diametrically opposed, inwardly extending crimped portions 16 and 17 to establish a unique plane of oscillation of the piston rod 13 within the sleeve member 10 and for removably capturing such piston rod in the manner described below.

The piston rod 13 is spring-loaded in a suitable cavity (not shown) and for this purpose is provided with a coaxial spring 23 (FIG. 3). A front boundary edge 18, which provides the interface between the relatively small principal diameter of the piston rod 13 and the spherical end section 14, is of larger diameter than the main piston rod diameter as shown to facilitate the support of the piston rod within the sleeve.

The spherical section 14 is designed to be smaller than a hemisphere, i.e., the chord length established by the front boundary surface 18 is smaller than the diameter of a circle having the same radius of curvature as that of the spherical section 14. This facilitates the disconnection of the sleeve from the piston rod for maintenance of the sub-assembly.

As shown best in FIG. 2, the inwardly crimped portions 16 and 17 of the ring 15 extend forwardly and inwardly in overlapping relation to the front boundary surface 18 of the spherical section 14. The degree of overlap is made just sufficient to establish respective gaps 33—33 between the portions 16 and 17 and the surface 18, thereby permitting axial play of the sleeve to compensate for errors in the piston rod travel. Additionally, the combination of the overlap provided by the portions 16 and 17 and the provision of the gaps 33 enable the sleeve 10 to be adjusted in any direction perpendicular to its axial direction of movement.

In order to prevent the inadvertment disassembly of the piston rod and sleeve when the sleeve oscillates in the plane established by the portions 16 and 17, an abutment ring 22 is removably pressed over the spring 23 and over the main diameter of the piston rod 13 in the vicinity of the spherical end portion 14. The abutment ring 22 has a diameter larger than that of the piston rod and of the spherical section so that its outer peripheral edge may contact a front boundary surface 34 of the sleeve member 10 when oscillated through an angle α. As so assembled, the rear surface of the abutment ring 22 may be placed in contact with a front surface 21 (FIG. 2) of an intermediate step portion 20 provided on the piston rod 13, such step portion having a diameter intermediate the diameters of the main piston rod portion and the spherical section.

In addition, a conical section 19 may be disposed coaxial with the piston rod between the front boundary surface 18 and the rear surface of the intermediate step member 20. As shown, the conical section 19 is arranged to taper inwardly in the forward direction.

The above-mentioned sub-assembly is easily disconnectable for maintenance purposes. To accomplish this, the spring 23 and the abutment ring 22 shown in FIG. 3 are first removed, whereupon the sleeve 10 is free to oscillate in the plane of the portions 16 and 17 (FIG. 2) through an angle greater than the angle α. Such increased amplitude of oscillation of the sleeve member 10 is effective to rotate such sleeve member clear of the piston rod to effect a complete disassembly of the apparatus.

As shown best in FIG. 2, the rearmost portion of the spherical section 14 is flattened to provide a lubricating oil pocket 24 at the bottom of the recess 12. Such pocket 24 communicates, via an axial passage 25 in the sleeve body 31, with a reservoir 26 associated with the rear surface 11 of the sleeve. The lubricating fluid is supplied from a different region of the pump by means of an axial channel 27 extending through the piston rod 13, the step member 20, the conical section 19 and the spherical section 14.

In the foregoing, the invention has been described in connection with an illustrative embodiment thereof. Many variations and modifications will now occur to those skilled in the art. It is accordingly desired that the scope of the appended claims not be limited to the specific disclosure herein contained.

What is claimed is:

1. In a radial pump sub-assembly comprising an elongated, piston rod having a main rod portion fixedly coupled to a spherical end portion coaxial therewith and disposed rearwardly of a rear end of the main rod portion, the spherical piston being received within a fixed mating spherical recess of a piston having an integral sleeve member mounted for rotational movement and oscillation with respect to the spherical section, the improvement wherein (a) the spherical portion is smaller than a hemisphere and terminates forwardly in a front boundary surface whose diameter is larger than the diameter of the main portion of the piston rod, and wherein (b) the sleeve member includes a peripheral region surrounding and extending forwardly of the spherical recess and having a pair of preformed, diametrically opposed portions projecting inwardly from the remainder of the peripheral region to define a plane of oscillation of the sleeve member with respect to the spherical end portion, the inwardly projecting portions confronting and forwardly overlapping the front boundary surface of the spherical portion to removably capture the spherical section.

2. The improvement as defined in claim 1, further comprising a conical portion coaxial with and disposed between the rear end of the main portion of the piston rod and the front boundary surface of the spherical portion, the conical section tapering inwardly in the forward direction.

3. The improvement as defined in claim 1, in which the inwardly projecting portions of the sleeve member are axially spaced from the front boundary surface of the spherical portion to provide limited axial play between the spherical portion and the sleeve member.

4. The improvement as defined in claim 1, further comprising an abutment ring removably and coaxially secured over the piston rod in a position that is normally forwardly spaced from the front boundary surface of the spherical portion, the abutment ring having an outer diameter substantially greater than the diameter of the spherical portion, the diameter of the abutment ring and the spacing thereof from the front boundary surface of the spherical portion being chosen to establish contact of the ring with the sleeve member upon an oscillation of the sleeve member through a predetermined angle with respect to the piston rod.

* * * * *